United States Patent [19]

Warnke

[11] 3,909,283

[45] Sept. 30, 1975

[54] PRODUCING LIGHTWEIGHT AGGREGATE

[76] Inventor: Wilbert E. Warnke, 14213 N. Gate Drive, Silver Spring, Md. 20906

[22] Filed: Mar. 4, 1974

[21] Appl. No.: 447,742

[52] U.S. Cl. ............................. 106/288 B; 106/40 R
[51] Int. Cl.$^2$ ......................................... C04B 31/02
[58] Field of Search ............. 106/40 V, 40 R, 288 B

[56] References Cited
UNITED STATES PATENTS 3,328,187  6/1967  Ban ................................. 106/288 B

FOREIGN PATENTS OR APPLICATIONS 210,012  4/1968  U.S.S.R. ........................... 106/288 B

*Primary Examiner*—L. Dewayne Rutledge
*Assistant Examiner*—John P. Sheehan

[57] ABSTRACT

A process for making lightweight aggregate by bloating clay, shale and a wide variety of waste products such as fly ash, overflow product from sand and gravel washing plants, slag from blast furnaces and waste in culm banks is described. The clay, shale or waste product is ground to approximately minus 35 mesh and then dry mixed with a small quantity (about 5 percent) of limestone or marble and a small quantity of carbonaceous material (about 5 percent) such as coal. The base material, limestone and coal mixture is then pelletized. The dried pellets are fired in a rotary kiln to about 2200°F for a period of 5 minutes and then discharged. The pellets expand several times their original volume when the carbon dioxide gas evolved from the limestone is trapped in pockets or cells formed by pyroplastic clay, shale or mineral waste.

10 Claims, No Drawings

PRODUCING LIGHTWEIGHT AGGREGATE

A number of patents has been assigned to inventors for various processes to produce lightweight aggregate and a number of laboratory tests have been conducted on shales and clays in this and foreign countries to determine which clays have the natural characteristics to bloat when fired to temperatures of about 2000° to 2400°F. There have been many assumptions as to what causes clays to bloat naturally but the actual mechanics of bloating clays and shales have not been ascertained. The most comprehensive work in developing a patented process was done by Mr. Harding who received Pat. No. 2,015,381 in 1935. Mr. Harding has a number of claims including one that calcium sulfate, when mixed with clay and pelletized, would cause the clay to bloat. The invention herein described uses calcium carbonate as the source of the gas, carbon dioxide. Calcium carbonate in the form of limestone or marble is very abundant throughout many localities of this country. This invention was developed to utilize very cheap and abundant raw materials, plus small amounts of low cost additives so that the product in the form of bloated pellets would be economically competitive with gravel and crushed stone as aggregate in concrete. The aggregate produced by this process can also be used in making lightweight concrete shapes for many purposes such as utility poles, fence posts, mine support beams, building blocks and insulating bricks.

Many areas of the United States do not have cheap and abundant sources of aggregate for the main bulk material in ordinary concrete mixes. Gravel deposits formed by ancient streams are being worked out. A case in point is the Washington-Baltimore area which has few gravel deposits worth working. The Delaware-Maryland peninsula, known as Eastern Shore, has no known gravel deposits and no rock deposits. Some of the mid-western states have few deposits of gravel or rock that can be quarried cheaply. This invention describes a process for producing aggregate from ordinary clay, shale, earth and mineral waste products. Because the base materials are literally "dirt cheap" and the two additives are used in small amounts and are also very low cost, the aggregates produced by the process are low cost. Because aggregates are used to provide bulk in concrete mixes and a ton of bloated clay or shale has 3 times the volume of a ton of gravel or crushed stone aggregate, lightweight aggregate produced cheaply could be economically competitive with gravel and crushed stone. If gravel or crushed stone has to be transported considerable distances, then lightweight aggregate produced by this process could indeed be delivered to the point of use at lower costs than for ordinary aggregate. Ready mix trucks are heavy and expensive because the equipment to haul 4 to 6 yards of ordinary concrete has to be exceptionally strong. If concrete weighing one third as much as ordinary concrete were used, the ready mix trucks could be smaller and cheaper. The net weight of the lightweight concrete would be only one third the weight of ordinary concrete and the tare weight of the trucks could be reduced by perhaps 50 percent. Thus, the use of lightweight aggregate in ready mix concrete has great economic potential.

Lightweight aggregate can command premium prices when used in making concrete utility poles, fence posts, support beams in underground mines, balconies, sun porches, roofs and other purposes in which weight is an overriding consideration. Lightweight aggregate should have application in making building blocks and bricks for their superior thermal insulating properties as well as light weight for ease of handling. This process is similar to many others in that clay or shale is bloated using conventional equipment such as a rotary kiln or other furnace configurations. This process is novel in that calcium carbonate in combination with coal or other form of carbonaceous material is added to the base material. Pellets made from the clay-limestone-coal mixture when fired to the softening point of the base mixture, will bloat or expand two to four times their volume depending on the amount of calcium carbonate added to the base material. These two additives are used because they cause the base material to bloat and both limestone and coal are very abundant and readily available. The limestone or marble can be low grade with considerable impurities such as iron, magnesium and carbonates of other elements. The coal can be in the form of lignite, bituminous, anthracite and graphitized coal with large amounts of impurities.

In this invention, the composition of the base material is not critical as the process will work satisfactory on a mineral material varying from sand which is predominantly silica to multiphase mineral compounds containing silica, lime, alumina, iron oxide, potassium and sodium oxides and other elements commonly found in clays and shales. In one experiment, a soft drink bottle was pulverized, coal and limestone were added, the mixture was pelletized and fired to 2200°F for 5 minutes. The pellet expanded to roughly three times its original volume and had a hard closed pore surface. High alumina clays are unsatisfactory because the softening point of alumina or bauxite clays is so high that the limestone disassociates at a temperature too far below the softening point of the clay. However, a high alumina material such as the "red muds" from the Bayer alumina process could be mixed with silica to lower the softening point of the mixture so it could be bloated.

The amount of bloating, and hence the bulk density of the aggregate can be controlled by the amount of limestone added to the clay as the limestone or marble is the source of carbon dioxide gas. As stated earlier, the coal or other form of carbonaceous material, merely raises the disassociation temperature of the limestone or marble. Test experiments disclosed that 5 percent by weight of calcium carbonate mixed with 3 to 5 percent by weight of coal caused a volume expansion of approximately three fold of pellets formed from the base material. The size of the vesicles inside the bloated pellets can be partially controlled by controlling the particle size of the limestone. Small vesicles will result from the addition of finely ground limestone, i.e., 65 mesh, although some of the small vesicles will coalesce to form a large vesicle. Converseley large particles of limestone, in the 28 mesh range, will form much larger vesicles in the bloated clay or shale. The internal structure of the pellets will influence the crushing or compressive strength of individual pellets and compressive strength of concrete made from such aggregate.

Because various size spheroids of bloated pellets provides maximum random close packing, concretes made from such aggregates have a high strength to weight ratio. Theoretically the voids in randomly packed spheroids of various sizes, in the range of bloated pellets, is about 15 percent which means concrete would require only 15 percent cement.

I claim:

1. A process for producing light-weight aggregate of predetermined bulk density and controlled internal pore size in a wide size range of bloated pellets, comprising the steps of pulverizing and mixing of about 90–99 percent by weight of a mineral material selected from the group consisting of clay, shale and certain mineral processing wastes with about 1 to 7 percent by weight of calcium carbonate and 1 to 7 percent by weight of a carbonaceous material, pelletizing the mixture, drying the pellets and firing the pellets to about 2200°F. for about 5 minutes.

2. The process of claim 1 in which the mineral material is clay.

3. The process of claim 1 in which the mineral material is shale.

4. The process of claim 1 in which the mineral material is fly ash.

5. The process of claim 1 in which the mineral material is culm bank and coal waste.

6. The process of claim 1 in which the mineral material is furnace slags.

7. The process of claim 1 in which the calcium carbonate is limestone.

8. The process of claim 1 in which the calcium carbonate is marble.

9. The process of claim 1 in which the carbonaceous material is coal.

10. The process of claim 1 in which the carbonaceous material is coke.

* * * * *